(12) United States Patent
Rotsaert (10) Patent No.: US 10,282,730 B2
(45) Date of Patent: May 7, 2019

(54) METHOD FOR MANAGING A TRANSACTION, CORRESPONDING SERVER, COMPUTER PROGRAM PRODUCT AND STORAGE MEDIUM

(71) Applicant: Roam Data, Inc., Wilmington, DE (US)

(72) Inventor: Christopher Rotsaert, Wasquehal (FR)

(73) Assignee: INGENICO INC., Alpharetta, GA (US)

( * ) Notice: Subject to any disclaimer, the term of this patent is extended or adjusted under 35 U.S.C. 154(b) by 259 days.

(21) Appl. No.: 15/325,229

(22) PCT Filed: Jul. 10, 2015

(86) PCT No.: PCT/IB2015/055220
§ 371 (c)(1),
(2) Date: Jan. 10, 2017

(87) PCT Pub. No.: WO2016/005947
PCT Pub. Date: Jan. 14, 2016

(65) Prior Publication Data
US 2017/0186016 A1    Jun. 29, 2017

(30) Foreign Application Priority Data
Jul. 10, 2014   (FR) .................................... 14 56677

(51) Int. Cl.
*G06Q 20/20* (2012.01)
*G06Q 20/32* (2012.01)
*G06Q 20/42* (2012.01)

(52) U.S. Cl.
CPC ......... *G06Q 20/425* (2013.01); *G06Q 20/202* (2013.01); *G06Q 20/204* (2013.01); *G06Q 20/3255* (2013.01)

(58) Field of Classification Search
USPC .......................................................... 705/17
See application file for complete search history.

(56) References Cited

U.S. PATENT DOCUMENTS

| 7,392,388 B2 * | 6/2008 | Keech | G06Q 20/02 713/168 |
| 7,600,676 B1 * | 10/2009 | Rados | G06Q 20/40 235/380 |

(Continued)

OTHER PUBLICATIONS

International Search Report dated Sep. 10, 2015 for corresponding International Application No. PCT/IB2015/055220, filed Jul. 10, 2015.
Written Opinion of the International Searching Authority dated Sep. 10, 2015 for corresponding International Application No. PCT/IB2015/055220, filed Jul. 10, 2015.

(Continued)

*Primary Examiner* — Ashford S Hayles
(74) *Attorney, Agent, or Firm* — David D. Brush; Westman, Champlin & Koehler, P.A.

(57) ABSTRACT

A method for managing at least one transaction implemented by an electronic payment terminal having a magnetic stripe reader for reading a paycard of a user. The method includes the following acts implemented in a secured remote server: receiving, from the electronic payment terminal, a transaction message carrying a piece of data of the card, read by the magnetic stripe reader and encrypted by the electronic payment terminal, and an identifier of a mobile communications terminal of the user; sending, to the mobile terminal, a transaction validation request message carrying a piece of information on the transaction; receiving, from the mobile terminal, a validation message carrying a response to the validation request message; managing the transaction.

5 Claims, 3 Drawing Sheets

(56) References Cited

U.S. PATENT DOCUMENTS

| | | | | |
|---|---|---|---|---|
| 7,716,129 B1* | 5/2010 | Tan | G06Q 20/02 | 705/35 |
| 8,346,672 B1* | 1/2013 | Weiner | H04W 12/06 | 705/75 |
| 8,374,916 B2* | 2/2013 | White | G06Q 20/04 | 455/410 |
| 8,655,789 B2* | 2/2014 | Bishop | G06Q 20/10 | 705/64 |
| 9,112,857 B2* | 8/2015 | Coppinger | G06Q 20/20 | |
| 9,123,042 B2* | 9/2015 | von Mueller | G06Q 20/20 | |
| 9,235,839 B2* | 1/2016 | Dua | G06Q 20/20 | |
| 9,367,842 B2* | 6/2016 | Quigley | G06Q 20/3674 | |
| 9,449,319 B1* | 9/2016 | Agarwal | G06Q 20/382 | |
| 9,584,499 B2* | 2/2017 | Nandakumar | G06F 21/36 | |
| 9,768,963 B2* | 9/2017 | Chu | H04L 9/3228 | |
| 9,832,649 B1* | 11/2017 | Curran | H04W 12/08 | |
| 9,846,866 B2* | 12/2017 | Royyuru | G06Q 20/4012 | |
| 9,916,581 B2* | 3/2018 | Dorsey | G06Q 20/322 | |
| 10,007,909 B2* | 6/2018 | Collinge | H04L 63/0428 | |
| 10,050,790 B2* | 8/2018 | Gawlas | G06F 21/41 | |
| 10,055,740 B2* | 8/2018 | Hanson | G06Q 30/00 | |
| 10,089,617 B2* | 10/2018 | Royyuru | G06Q 30/00 | |
| 2002/0035539 A1* | 3/2002 | O'Connell | G06Q 20/02 | 705/39 |
| 2003/0055738 A1* | 3/2003 | Alie | G06Q 20/04 | 705/26.1 |
| 2005/0250538 A1* | 11/2005 | Narasimhan | G06Q 20/12 | 455/558 |
| 2006/0059110 A1* | 3/2006 | Madhok | G06Q 20/04 | 705/75 |
| 2007/0143230 A1* | 6/2007 | Narainsamy | G06Q 10/10 | 705/75 |
| 2007/0175978 A1* | 8/2007 | Stambaugh | G06Q 20/32 | 235/379 |
| 2007/0255620 A1* | 11/2007 | Tumminaro | G06Q 20/10 | 705/14.27 |
| 2008/0040276 A1* | 2/2008 | Hammad | G06Q 20/085 | 705/44 |
| 2008/0189186 A1* | 8/2008 | Choi | G06Q 20/12 | 705/26.35 |
| 2008/0288404 A1* | 11/2008 | Pirzadeh | G06F 21/31 | 705/44 |
| 2009/0063345 A1* | 3/2009 | Erikson | G06Q 20/10 | 705/44 |
| 2009/0083160 A1* | 3/2009 | Hagale | G06Q 20/10 | 705/17 |
| 2009/0185687 A1* | 7/2009 | Wankmueller | H04L 9/3273 | 380/277 |
| 2010/0312709 A1* | 12/2010 | Maddocks | G06Q 20/4012 | 705/72 |
| 2011/0071914 A1* | 3/2011 | Beasley | G06Q 20/105 | 705/21 |
| 2011/0113245 A1* | 5/2011 | Varadarajan | G06F 21/34 | 713/168 |
| 2011/0184867 A1* | 7/2011 | Varadarajan | G06Q 20/04 | 705/44 |
| 2012/0011066 A1* | 1/2012 | Telle | G06Q 20/385 | 705/44 |
| 2012/0136796 A1* | 5/2012 | Hammad | G06Q 20/12 | 705/67 |
| 2012/0144461 A1* | 6/2012 | Rathbun | H04L 9/3213 | 726/5 |
| 2013/0173475 A1* | 7/2013 | Lund | G06Q 20/20 | 705/67 |
| 2013/0185166 A1* | 7/2013 | Larkin | G06Q 20/20 | 705/21 |
| 2014/0008432 A1* | 1/2014 | de Geer | G06Q 20/204 | 235/379 |
| 2014/0025579 A1* | 1/2014 | Nilsson | G06F 21/35 | 705/44 |
| 2014/0058938 A1* | 2/2014 | McClung, III | G06Q 20/227 | 705/41 |
| 2014/0089205 A1* | 3/2014 | Kapur | G06Q 20/40 | 705/72 |
| 2014/0279112 A1* | 9/2014 | Ulrich | G06Q 20/322 | 705/21 |
| 2014/0297530 A1* | 10/2014 | Eckel | G06Q 20/4014 | 705/44 |
| 2014/0358777 A1* | 12/2014 | Gueh | G06Q 20/3223 | 705/43 |
| 2014/0365366 A1* | 12/2014 | Spinella | G06Q 20/027 | 705/44 |
| 2015/0006388 A1* | 1/2015 | Myers | G06Q 20/40 | 705/44 |
| 2015/0046340 A1* | 2/2015 | Dimmick | G06Q 20/40 | 705/72 |
| 2015/0120560 A1* | 4/2015 | Fisher | G06Q 20/4014 | 705/44 |

OTHER PUBLICATIONS

International Preliminary Report on Patentability dated Apr. 1, 2016 for corresponding International Application No. PCT/IB2015/055220, filed Jul. 10, 2015.

English translation of the International Preliminary Report on Patentability dated Apr. 1, 2016 for corresponding International Application No. PCT/IB2015/055220, filed Jul. 10, 2015.

* cited by examiner

METHOD FOR MANAGING A TRANSACTION, CORRESPONDING SERVER, COMPUTER PROGRAM PRODUCT AND STORAGE MEDIUM

1 CROSS-REFERENCE TO RELATED APPLICATIONS

This Application is a Section 371 National Stage Application of International Application No. PCT/IB2015/055220, filed Jul. 10, 2015, the content of which is incorporated herein by reference in its entirety, and published as WO2016/005947 on Jan. 14, 2016, not in English.

2 FIELD OF THE INVENTION

The present invention pertains to the field of bank transactions and more particularly to bank transactions via an electronic payment terminal that does not require the entry of a confidential code on the part of the consumer/user (for example a terminal having a magnetic stripe reader).

More specifically, the invention pertains to the securing of such transactions as well as to their ergonomic comfort for the consumer.

3 PRIOR-ART SOLUTIONS

Electronic payment terminals that do not require/support the entry of a confidential code by the consumer, for example electronic payment terminals having only a magnetic stripe reader, have been made popular in the United States for use by merchants making few transactions. The major interest of these terminals is their low cost.

At present, the use of such electronic payment terminals that do not require the entry of a confidential code is essentially authorized in the United States and in other markets with bank credit cards of certain groups.

By contrast, VISA® Europe and, as part of a general trend, in markets using EMV® cards, the use of terminals limited to the reading of magnetic cards is prohibited for transactions made by the merchant.

One alternative which initially emerged through start-ups in the mobile payment field consists in considering an e-commerce type transaction made by the consumer as a transaction prepared by the merchant (preparing a shopping basket), who sends an SMS or email message to the consumer who finalizes the commercial-type transaction online by using his own terminal.

The payment procedure for online-type commerce consists in entering pieces of bank data (number, security code or cryptogram, expiry date, etc) which are transmitted in a secured manner to an intermediate server which transmits this information, again in a secured manner, to the purchasing organization.

Currently, such an online payment procedure can be secured by a securing technique, for example of a "3-D Secure®" type, implementing one or more additional steps in which a secure code (which is a static code or one-time-use code) is sent by SMS to the consumer's mobile phone or by email to a predetermined electronic address. The consumer must then enter this code to really confirm the transaction. These online payment securing solutions provide an alternative to the entry of a confidential code by the consumer.

One of the drawbacks of these online commercial transactions lies in the transmission, admittedly through a secured interface provided by the online commercial site, of bank card data entered by the consumer himself on his computer for example. This bank card information will then be available in plaintext form on the consumer's computer, thus affecting the security of such transactions.

Another drawback of these online commercial transactions lies in the fact that there are numerous operations to be performed by the user (classically, the entry of the card bearer's name, the card bearer's number with 16 digits, the date of expiry and the three-digit security code) as well as the need for him to consult the SMS or his email inbox in order to enter the security code. This sometimes leads the consumer to abandon the transaction.

Thus, when this online payment procedure is used to secure a transaction with a merchant, after the reading of the magnetic stripe of the bank card, the transaction time is greatly lengthened and there is a great decrease in ergonomic comfort for the consumer. Indeed, the online commercial procedure must be done on a mobile phone which gives rise to additional difficulties related to the potential lack of user-friendliness and even the impossibility of finalizing the transaction if the user's mobile phone does not accept this type of online commercial application.

There is therefore a need for a solution to secure a bank transaction made on a payment terminal that does not require the entry of a confidential code while at the same time offering optimal ergonomic comfort to the consumer in terms of time of processing of the transaction and the entries to be made.

Indeed, one of the challenges lies in the possibility of using such electronic payment terminals which are intrinsically less costly for any type of bank card, in complying with security norms and in not lowering the ergonomic comfort of the transaction for the consumer.

4 SUMMARY OF THE INVENTION

The invention relates to a method for managing at least one transaction implemented by an electronic payment terminal having a magnetic stripe reader for the reading of a paycard of a user.

According to the invention, the method comprises the following steps implemented in a secured remote server:
  a step for receiving, from the electronic payment terminal, of at least one transaction message carrying at least one piece of data of the user's paycard, read by the magnetic stripe reader and encrypted by the electronic payment terminal, and at least one identifier of a mobile communications terminal of the user;
  a step for sending, to the mobile terminal corresponding to the identifier, at least one transaction validation request message carrying at least one piece of information representing the transaction;
  a step for receiving, from the mobile terminal corresponding to the identifier, at least one validation message carrying at least one response to the validation request message;
  a step for managing the transaction if the response is positive.

Thus, the invention, in its different particular embodiments, proposes a novel and inventive solution for the management of a transaction implemented by an electronic payment terminal that does not support the entry of a confidential code of a user, making it possible to reinforce the security of such a transaction, while at the same time offering the user optimal ergonomic comfort.

The invention makes it possible to meet the need for the use of a low-cost terminal in complying with the requirements of an online transaction with a high level of security. It also provides security equal to that of a "card present" transaction with the implementation of a "CVM" (cardholder verification method).

The invention in its different embodiments reinforces the security of such transactions in providing security equal to that of a "card present" type transaction without, at the same time, lowering the user's ergonomic comfort. It achieves this by requesting the user for a simple validation of the transaction on a mobile terminal in his possession.

Thus, the electronic payment terminal transmits, in a secured way, to a secured intermediate server, the information on the user's bank card read (by the magnetic stripe reader) and then encrypted. The pieces of bank card data are therefore not transmitted in "plaintext" or unencrypted form to the secured intermediate server as in the case of an online commercial transaction where the elements of the card are transmitted in plaintext form by the user's terminal.

These pieces of encrypted data are used by the secured intermediate server to build a "transaction validation request" message (i.e. a message requesting validation of a transaction) intended for the user, this message comprising for example information on the transaction (amount, date and time, etc) as well as a part of the data of the bank card (for example the number of the card partly masked, the cardholder's name, expiry date, etc) so that the user can validate the transaction on the basis of this information. This transaction validation request message is therefore transmitted by the secured intermediate server to a mobile terminal of the user, the identifier of which has been transmitted to the secured intermediate server by the merchant's electronic payment terminal. This identifier can correspond to a mobile telephone number of the cardholder for example, which the merchant requests from the cardholder and enters through his electronic payment terminal.

The "transaction validation request" message can take the form of an SMS for example or an email message and consists simply in asking the user for his agreement to the transaction identified in the message by a simple response (SMS or email) to the "transaction validation request" message. When the cardholder responds positively to this "transaction validation request" message, the secured intermediate server can then implement the different steps of a "e-commerce" type transaction with the purchaser concerned without any transmission of the bank card data in plaintext form and with the sole requirement of an agreement by the card-holding user through a simple response to a message transmitted on his mobile telephone.

The invention is also compliant with the requirements of an online transaction activated by the consumer on his terminal.

According to one particular aspect of the invention, the method comprises, when the transaction is finalized, a step for transmitting at least one transaction finalizing message intended for the electronic payment terminal and at least one transaction finalizing message intended for the user's mobile terminal.

Thus, when the transaction has been brought its final point (of acceptance or rejection), the securing intermediate server transmits a message to the merchant's electronic payment terminal as well as to the user's mobile terminal indicating that the transaction has truly been finalized. The two actors in the transaction, namely the merchant and the consumer, are therefore informed of the result of the transaction.

According to one particular characteristic of the invention, the method furthermore comprises a step for securing a transaction comprising the following sub-steps:

transmission of at least one securing code, by a server of a bank organization corresponding to the user's bank card, to a communications terminal of the user preliminarily identified with the bank organization;

reception by the secured intermediate server of the securing code coming from the user's communications terminal.

Thus, to meet security requirements on the authentication of the cardholder, the invention according to this embodiment integrates a securing technique implemented by the cardholder's bank organization. For example, this securing technique is of the "3-D Secure®" type and consists in transmitting to a mobile terminal of the user (preliminarily registered by the user with his bank organization) of a code (for single-time use or not for single-time use) for example an alphanumeric code, which the user must send to the intermediate server in order to validate the transaction. The secured server processes the message received from the consumer to extract the validation information (the "OK" information) or the "3-D Secure" code.

According to another aspect of the invention, the method comprises the following steps implemented by the user's mobile terminal:

loading of a multimedia application;

reception and processing by the multimedia application of the transaction validation request message;

display, on the mobile terminal of the user, of a user interface presenting the user with a validation means;

transmission, to the secured intermediate server, of the validation message if the user has accepted the transaction via the validation means.

Thus, the processing of the transaction validation request message sent by the secured intermediate server can be done by a mobile application preliminarily downloaded onto the user's mobile terminal. For example, this mobile application can intercept the message (SMS or email) and re-transmit it to the user via a user-friendly and ergonomically comfortable user interface having for example a validation button on which the user must click to accept the transaction instead of responding to the SMS or to the email.

In particular, the method also comprises a step for receiving the securing code and the validation message carries the securing code.

Thus, this embodiment corresponds to the case where a mobile application is used to manage the validation of a transaction and where a securing technique of the "3-D Secure®" type for example is implemented. In this case, the mobile application can intercept the message from the bank organization transmitting the securing code and insert this securing code into the validation message transmitted when the user clicks on the user interface validation button. The user thus does not need to enter the securing code received. He only has to accept or decline the transaction.

For example, the transaction validation request message corresponds to an SMS or email type message.

The invention also concerns a secured intermediate server for implementing a method for managing at least one transaction implemented by an electronic payment terminal presenting a magnetic stripe reader for the reading of a user's paycard, the secured intermediate code comprising the following means:

means for receiving at least one transaction message from the electronic payment terminal, the transaction message carrying at least one piece of data on the user's paycard read by the magnetic stripe reader and encrypted by the electronic payment terminal and at least one identifier of a mobile communications terminal of the user;

means of sending at least one transaction validation request message to the mobile terminal corresponding to the identifier, said transaction validation request message carrying at least one piece of information representing the transaction;

means for receiving, from the mobile terminal corresponding to the identifier, of at least one validation message carrying at least one response to the validation request message;

means for managing the transaction if the response is positive.

Such a secured intermediate server is especially adapted to implementing the method for managing at least one transaction described here above. Such a server could of course comprise the different characteristics of the method for managing a transaction according to the invention. These characteristics can be combined or taken in isolation. Thus, the characteristics and advantages of this server are the same as those of the method for managing at least one transaction and are not described in more ample detail.

The method also concerns a computer program downloadable from a communications network and/or stored on a computer-readable support and/or executable by a processor comprising program code instructions for the execution of the method described here above when it is executed by a processor.

The method according to the invention can therefore be implemented in various ways, especially in wired or software form.

This program can use any programming language whatsoever and take the form of a source code, object code or intermediate code between source code and object code in a partially compiled form or in any other form desired.

Finally, the invention also concerns a computer-readable and non-transient storage medium storing a computer program comprising a set of instructions executable by a computer or a processor to implement the method described here above.

5 LIST OF FIGURES

Other features and advantages of the invention shall appear more clearly from the following description of a particular embodiment given by way of a simple, illustratory and non-exhaustive example and from the appended drawings, of which.

6 DETAILED DESCRIPTION OF THE INVENTION

6.1 General Principle

The principle of the invention consists in optimizing the security of a transaction implemented by a terminal that does not require the entry of a confidential code on the part of the user and more particularly in securing the transmission of bank card data while at the same time offering optimal ergonomic comfort for the user.

To this end, the invention according to its different embodiments implements a secured intermediate server which makes it possible to set up a link between the merchant's electronic payment terminal (which reads the bank card data, encrypts it and then transmits it in a secured manner to the secured intermediate server) and the consumer who is the bank card holder (who is being asked to accept the transaction according to information related to said transaction which is given to him on his mobile terminal).

This secured intermediate server then initiates an online commercial transaction as if it were coming from the consumer without the bank card data having travelled in plaintext form via the user's mobile telephone and without the user being asked to make numerous entries (unlike in a classic online commercial transaction).

The different embodiments of the invention relate more particularly to electronic payment terminals having a magnetic stripe reader to read the bank card data. It goes without saying that the invention is not limited to this type of electronic payment terminal but applies to any electronic payment terminal that has to cope with proximate or similar problems, i.e. any terminal that does not require the entry of a confidential code by the cardholder but for which the transactions must be more secured than in the prior art techniques.

6.2 Description of One Embodiment

Figure 1:
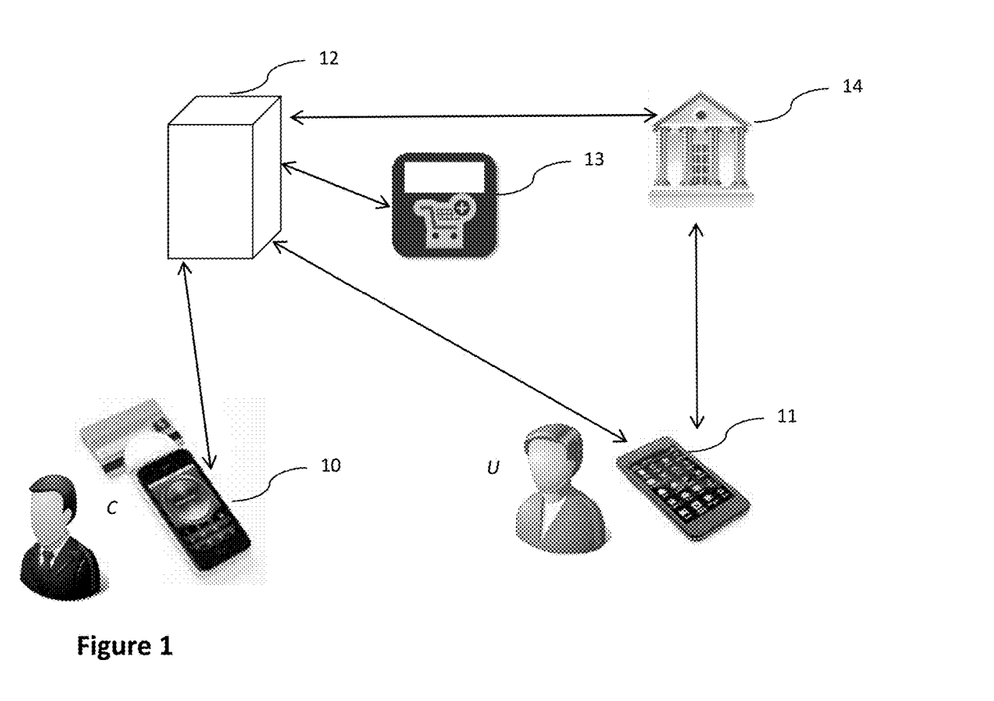
FIG. 1 illustrates an example of a system for implementing the method for managing a transaction, according to one particular embodiment of the invention.

Initially, a description shall be provided of one example of a system illustrated in FIG. 1, in which the invention can be implemented according to its different embodiments.

In the context of the invention, a consumer/user U wishes to purchase an item or a service by paying for it with his bank card via the electronic payment terminal 10 of a merchant C. This electronic payment terminal 10 enables the reading of the bank card data by means of a magnetic stripe reader.

The user U carries a mobile communications terminal 11, for example a smartphone.

The remote entities also involved are especially the banking organization 14 of the cardholder (in this case the user U) as well as the online payment service 13 managing the online transaction corresponding to the purchase made by the user U on behalf of the merchant C. The other entities that can be involved in such a classic online commercial transaction are not shown.

Finally, a secured intermediate server 12 is necessary to implement the invention.

For example, and as illustrated in FIG. 1, a reference system for applying the invention comprises, for the merchant C, a "payment accessory" type reader that integrates only the functions of reading the card and encrypting the read data and is associated with or attached to a smartphone communicating with the secured server 12 and accepting the entry of a shopping basket as well as the telephone number of the consumer U.

Figure 2A:
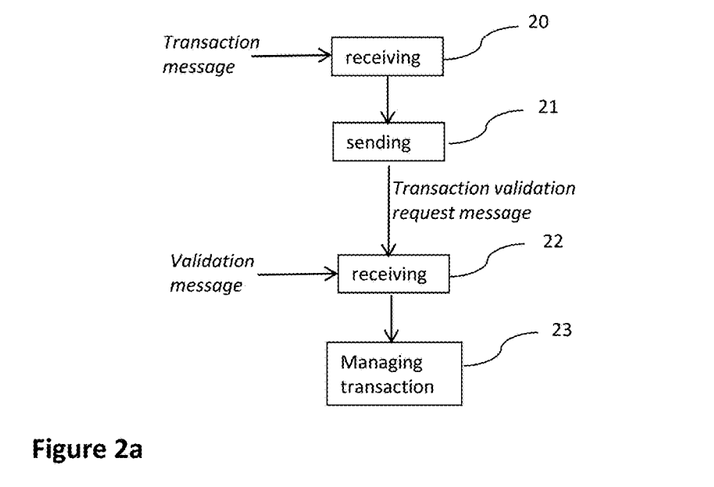
FIGS. 2a and 2b present the main steps of the method for managing a transaction according to one embodiment of the invention, in a system as illustrated in FIG. 1.

Referring now to FIG. 2a, we describe the main steps of the method for managing a transaction according to one particular embodiment of the invention in a system as described here above with reference to FIG. 1.

According to this embodiment of the invention, the merchant C inserts the bank card of the user U in the magnetic stripe reader of his electronic payment terminal 10 in order to initiate the transaction for the purchase of an item or a service desired by the user U. The pieces of data on the bank card are read, then encrypted by the electronic payment terminal 10 and then transmitted in a secured manner via a transaction message to the secured intermediate server 12.

According to this embodiment of the invention, a mobile terminal identifier 11 of the user U is also transmitted via the transaction message.

The secured intermediate server 12 therefore receives a transaction message during a reception step 20. This transaction message bears especially at least one of the pieces of bank card data of the user U as well as the identifier of the mobile terminal 11.

Then, in a sending step 21, the secured intermediate server 12 sends out a transaction validation request message, intended for the mobile terminal 11 identified in the first message received. The purpose of this transaction validation request message is to enable the user to validate the transaction in a simple and ergonomically comfortable way, using the information relating thereto.

According to different alternative embodiments, this transaction validation request message can be sent out by the secured intermediate server 12 in the form of an SMS or an email displaying especially the information described in detail here below and to which the user U can respond by a message of the same format/type (an SMS or an email message).

For example, the transaction validation request message comprises information on the date and time of the transaction, the amount of the transaction, the merchant, etc as well as a part of the information read on the bank card of the user U (the truncated card number, the cardholder's name, the expiry date, etc). In this way, the user U can validate the transactions if he recognizes the information to be correct.

In addition, this transaction validation request message comprises a text intended for the user telling him how to respond to validate the transaction. For example, the text tells the user to respond to the same number in indicating "OK" in the response.

Thus, the user U has only a restricted number of entries to make, for example to validate the choice "respond" to the SMS or to the email message and enter the validation text as indicated in the transaction validation request message (for example "OK").

For greater ergonomic comfort for the user U, and if the mobile terminal 11 allows it, a particular multimedia application can be downloaded onto this mobile terminal 11 (for example the time at which the user U receives or activates his bank card). Once installed in the mobile terminal 11, the multimedia application can intercept the transaction validation request message to decode it and then display a specific user interface on the screen. For example, this user interface not only restores all the information on the transaction but also gives the user a simple and ergonomically comfortable means of validation (such as an "OK" button on which the user can click). Thus, in a single entry (for example one click on a button), the user U can validate the transaction from his mobile terminal 11.

Whatever the variant of the embodiment (response to an SMS or an email message or via a multimedia application), a validation message is therefore transmitted by the mobile terminal 11 of the user U to the secured intermediate server 12 which receives it during a reception step 22.

This validation message therefore comprises a response to the transaction validation request message which the secured intermediate server 12 can interpret in order to initiate or not initiate a classic online commercial transaction especially with reference to the online payment service 13.

Thus, if the user's response is positive, the secured intermediate server 12 implements a step 23 for managing an online commercial transaction in a classic way. By contrast, unlike an online commercial transaction, the pieces of bank card data are not transmitted from the mobile terminal 11 of the user U but come in a secured and encrypted way from the electronic payment terminal 10 of the merchant C.

According to these different embodiments of the invention, the secured intermediate server 12 makes it possible to set up a link between the merchant C and the user U in order to secure the transmission of bank card data while at the same time optimizing the ergonomic comfort of the transaction for the user U.

When the transaction is finalized, the secured intermediate server 12 sends out a confirmation message to the merchant C via his electronic payment terminal 10 as well as to the user U via his mobile terminal 11.

If the user U does not validate the transaction, a validation message carrying a negative response can be received by the secured intermediate server 12 who then does not initiate the online commercial transaction, thus putting an end to the transaction.

Or else, if the secured intermediate server 12 receives no response, via a validation message, to its message requesting validation of the transaction, at the end of a certain time (for example upon expiry of a timer activated when sending the transaction validation request message), it brings the transaction to an end.

According to one particular embodiment of the invention, an additional technique for securing can be implemented, for example at the initiative of the cardholder's banking organization 14, as in the case of a classic online commercial transaction. For example, this securing technique is of the 3-D Secure® type and consists of the transmission, on a communications terminal of the cardholder (preliminarily identified with the banking organization 14) of a securing code which the user must then enter on the online payment interface in order to validate the transaction.

The number of the communications terminal registered with the banking organization 14 may be that of the mobile terminal 11 or another communications terminal in the possession of the user U.

If it is a mobile terminal 11, the user U receives therefore the security code on his mobile terminal 11 and must enter it also on his mobile terminal 11, in response to the transaction validation request message emitted by the secured intermediate server 12.

Should a multimedia application be installed on this mobile terminal 11 to process the transaction validation request messages sent by the secured intermediate server 12, this multimedia application can also intercept the message sent out by the banking organization 14 in order to extract the security code therefrom. It can then include it automatically in the validation message which will be transmitted in return to the secured intermediate server 12 when the user has validated the transaction.

Thus, an additional securing technique of the transaction making it possible especially to authenticate the cardholder can be integrated into the method for managing a transaction according to one particular embodiment of the invention, further reinforcing the security of such a transaction.

Figure 2B:
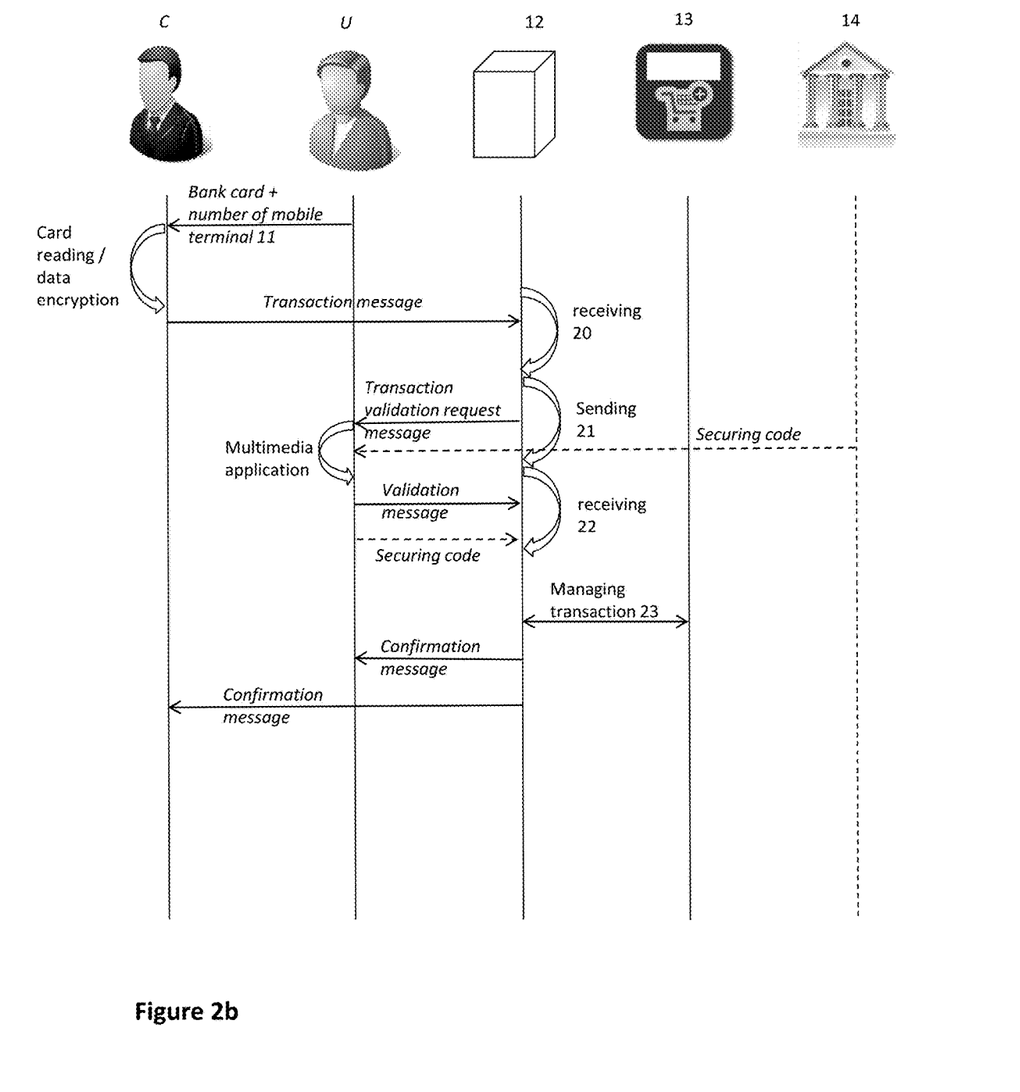

FIG. 2b illustrates the main stages of the method for managing a transaction described here above in the form of a diagram of sequences according to one particular embodiment of the invention in a system as described here above with reference to FIG. 1.

In this FIG. 2b, the exchanges between entities and the optional elements are represented in dashes (for example the implementing of the multimedia application on the mobile terminal 11 of the user U or again the securing by transmission of a security code of the banking organization of the user U towards the mobile terminal 11 of the user U).

We consider therefore a user U wishing to purchase an item or a service from a merchant C, who initiates a transaction through his electronic payment terminal 10. To this end, the user U gives the merchant C his bank card as well as the number of his mobile terminal 11 (for example his smartphone). The merchant C inserts the bank card of the user U into the magnetic stripe reader of his electronic payment terminal 10 in order to read the data of the bank card needed for any transaction. The merchant C then enters the number of the mobile terminal 11 provided by the user U (for example in response to a message displayed on the screen of his electronic payment terminal 10) on this electronic payment terminal 10.

The electronic payment terminal 10 of the merchant C encrypts the pieces of read data of the bank card and then inserts them with the number of the mobile terminal 11 in a transaction message. This transaction message is then transmitted in a secured way by the electronic payment terminal 10 to the secured intermediate server 12.

The sever 12 therefore receives the transaction message during a reception step 20 and processes it so as to build a transaction validation request message intended for the user U, via the mobile terminal identified by the number carried by the preliminarily received transaction message. This transaction validation request message carries for example information on the transaction (date and time, amount, place of transaction, merchant's identification, etc) as well as information on the bank card of the user U (for example the truncated card number to ensure security, date of expiry, holder's name, etc). Thus, the user receiving this message can identify the transaction in question and validate or not validate it, in full knowledge of the facts.

This message requesting validation of transaction is transmitted by the secured intermediate server 12 to the mobile terminal 11 during a sending step 21, for example in the form of an SMS message or an email message. Furthermore, as already indicated, the message also contains information intended for the user for the formulation of his response to the message (for example a text indicating that the user must return a reply to the same number with "OK" in the body of his SMS or email).

According to one alternative embodiment, already described here above, when a specific multimedia application is installed on the mobile terminal 11, this application intercepts the transaction validation request message and renders it to the user in the form of a user-friendly and ergonomically comfortable user interface. For example, this user interface has a button enabling the user to validate the transaction simply by clicking over it. The user interface can also propose a transaction rejection button thus enabling the user U to not validate the transaction.

Then, whatever the embodiment, a validation message is transmitted by the mobile terminal 11 to the secured intermediate server 12 bearing the validation response which the user U has entered.

This message is received and processed by the secured intermediate server 12 during a reception step 22 so as to continue or not continue the transaction in the form of an online commercial transaction, in relation especially with the online payment service 13.

Thus, if the response carried by the validation message is positive, the secured intermediate server 12 initiates an online commercial transaction, in a transaction management step 23, as if the transaction had come from the user U but without the bank card data having traveled in plaintext form from the user U.

As already indicated here above, a technique for securing (for example by the transmission of a security code) enabling the authentication of the bank card holder can also be implemented, optionally when the banking organization of the card holder requires it in the case of an online commercial-type transaction.

Finally, when the online commercial transaction is finalized, between the secured intermediate server 12 and the online payment service 13 especially, the secured intermediate server 12 sends a transaction confirmation message both to the merchant C via his electronic payment terminal 10, and to the user U via his mobile terminal 11.

6.3 Description of an Example of a Secured Intermediate Server

Figure 3:
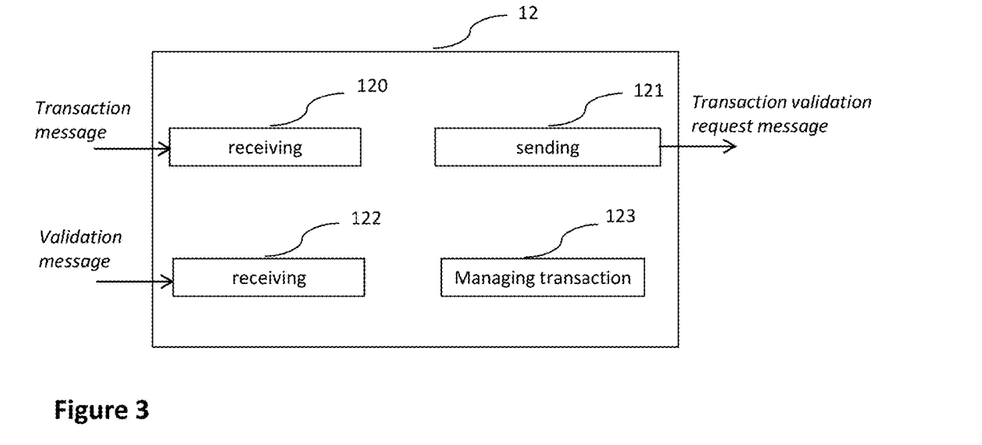
FIG. 3 presents an example of an intermediate server secured according to one particular embodiment of the invention.
Figure 4:
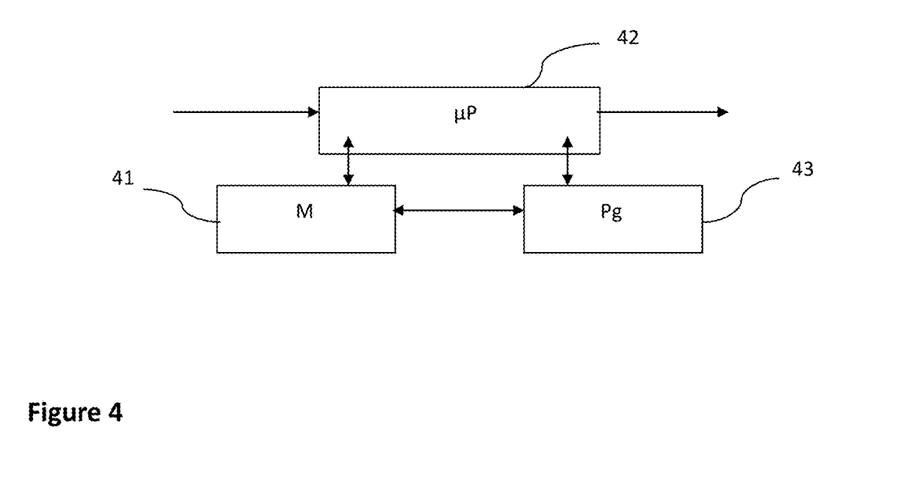

Referring now to FIG. 3 and FIG. 4, a description is provided of an example of a secured intermediate server implementing the transaction management method according to any one of the particular embodiments of the invention.

As illustrated in FIG. 3, the secured intermediate server 12 comprises especially message-receiving means 120 and 122, for example in the form of one or more distinct reception modules. Thus, the secured intermediate receiver 12 is especially capable of receiving a transaction message sent by an electronic payment terminal (not shown) and a validation message sent by a mobile terminal (not shown).

The secured intermediate server 12 also comprises message-sending means 121, for example in the form of sending module, enabling especially the transmission of a transaction validation request message, addressed to a mobile terminal (not shown).

Finally, the secured intermediate server 12 also comprises transaction management means 123 in the form of one or more modules making it possible especially to communicate with one or more remote entities (not shown) to implement an online commerce-type transaction.

The secured intermediate server 12 also integrates a decryption module (for example a model called an HSM or hardware secure module), also called a security module, which decrypts the card data received from the reader and then transmits it to the e-commerce server 13.

Besides, the secured intermediate server 12 is also capable of reformatting this piece of decrypted card data and then transmitting it to the e-commerce server 13. This reformatting can also be carried out by the decryption module of the secured intermediate server 12.

According to one alternative embodiment in which the secured intermediate server is partly controlled by the e-commerce server 13, the encryption and reformatting functions can be implemented by this e-commerce server 13.

FIG. 4 for its part illustrates an example of a simplified structure of a secured intermediate server 12 such as this comprising a memory 41 constituted by a buffer memory M, a processing unit 42, equipped for example with a microprocessor and driven by the computer program 43 implementing the transaction management method according to the different embodiments of the invention.

At initialization, i.e. when the secured intermediate server 12 is powered on, the computer program code instructions 43 are for example loaded into a memory and then executed by the processor of the processing unit 42. The processing unit 42 inputs at least one transaction message and implements the steps of the transaction management method according to the computer program instructions 43 to carry out a secured and ergonomically comfortable transaction.

Although the present disclosure has been described with reference to one or more examples, workers skilled in the art will recognize that changes may be made in form and detail without departing from the scope of the disclosure and/or the appended claims.

The invention claimed is:

1. A method of managing at least one transaction implemented by an electronic payment terminal having a magnetic stripe reader for reading a paycard of a user, wherein the method comprises:
the following acts implemented in a secured intermediate server:
receiving, from said electronic payment terminal, at least one transaction message carrying at least one piece of data of said payment card of said user, read by said magnetic stripe reader and encrypted by said electronic payment terminal, and at least one identifier of a mobile communications terminal of said user;
sending, to said mobile communications terminal corresponding to said identifier, at least one transaction validation request message carrying at least one piece of information representing said transaction;
receiving, from said mobile communications terminal corresponding to said identifier, at least one validation message carrying at least one response to said validation request message; and
managing said transaction when said response is positive;
an act of securing said transaction comprising the following sub-acts:
transmission of at least one securing code, by a server of a bank organization corresponding to said bank card of said user, to said mobile communications terminal; and
reception by said secured intermediate server of said securing code coming from said mobile communications terminal;
and the following acts implemented by said mobile communications terminal of said user:
loading of a multimedia application;
reception and processing by the multimedia application of the transaction validation request message;
reception of said securing code and insertion of said securing code into said validation message; and
display, on the mobile communications terminal of said user, of a user interface presenting the user with a validation; and
transmission, to said secured intermediate server, of said validation message when the user has accepted the transaction via said validation.

2. The method of managing at least one transaction according to claim 1, wherein the method comprises, when said transaction is finalized, an act of transmitting at least one transaction finalizing message intended for said electronic payment terminal and at least one transaction finalizing message intended for said mobile communications terminal of said user.

3. The method of managing at least one transaction according to claim 1, wherein said transaction validation request message corresponds to an SMS or email type message.

4. A secured intermediate server for implementing a method of managing at least one transaction implemented by an electronic payment terminal presenting a magnetic stripe reader for the reading of a paycard of a user, the secured intermediate server comprising:
a non-transitory computer-readable medium comprising instructions stored thereon; and
a processor configured by the instructions to perform acts comprising:
receiving at least one transaction message from said electronic payment terminal, the transaction message carrying at least one piece of data on said paycard of said user read by said magnetic stripe reader and encrypted by said electronic payment terminal and at least one identifier of a mobile communications terminal of said user;
sending at least one transaction validation request message to said mobile communications terminal corresponding to said identifier, said transaction validation request message carrying at least one piece of information representing said transaction;
receiving, from said mobile communications terminal corresponding to said identifier, at least one validation message carrying at least one response to said validation request message;
reception, from said mobile communications terminal, of a securing code; and
managing said transaction when said response is positive.

5. A computer-readable and non-transient storage medium storing a computer program comprising a set of instructions executable by a computer or a processor of a secured intermediate server to implement a method of managing at least one transaction implemented by an electronic payment terminal presenting a magnetic stripe reader for the reading of a paycard of a user, wherein the instructions configure the secured intermediate server to perform the following acts when executed by the computer or processor:
receiving at least one transaction message from said electronic payment terminal, the transaction message carrying at least one piece of data on said paycard of said user read by said magnetic stripe reader and encrypted by said electronic payment terminal and at least one identifier of a mobile communications terminal of said user;
sending at least one transaction validation request message to said mobile communications terminal corresponding to said identifier, said transaction validation request message carrying at least one piece of information representing said transaction;
receiving, from said mobile communications terminal corresponding to said identifier, at least one validation message carrying at least one response to said validation request message;
receiving a securing code from said mobile communications terminal; and
managing said transaction when said response is positive.

* * * * *